United States Patent [19]

Iijima

[11] Patent Number: 4,531,426
[45] Date of Patent: Jul. 30, 1985

[54] SUPPORTING STRUCTURE FOR A STEERING APPARATUS OF THE RACK AND PINION TYPE

[75] Inventor: Yoshitaka Iijima, Atsugi, Japan

[73] Assignee: Nissan Motor Co., Ltd., Yokohama, Japan

[21] Appl. No.: 545,225

[22] Filed: Oct. 25, 1983

[30] Foreign Application Priority Data

Oct. 29, 1982 [JP]  Japan ................................ 57-190623

[51] Int. Cl.³ .............................................. B62D 1/20
[52] U.S. Cl. ...................................... 74/498; 280/96; 280/96.1
[58] Field of Search ..................... 74/498; 280/96, 96.1

[56] References Cited

U.S. PATENT DOCUMENTS

| 3,632,127 | 1/1972 | Grosseau | 280/96.1 |
| 3,869,139 | 3/1975 | Gage | 74/498 |
| 3,958,462 | 5/1976 | Matschinsky et al. | 74/498 |
| 4,087,103 | 5/1978 | Smith | 280/96.1 |

Primary Examiner—Alan Cohan
Assistant Examiner—John A. Rivell
Attorney, Agent, or Firm—Schwartz, Jeffery, Schwaab, Mack, Blumenthal & Evans

[57] ABSTRACT

A supporting structure for a steering apparatus of the rack and pinion type with a rack axle supporting member. The supporting member is supported on a vehicle body by a clamping member through mounting insulators. This insulator comprises a first elastic means to receive smaller input forces by means of shearing stress and a second elastic means to receive larger input forces by means of compressive stress.

12 Claims, 6 Drawing Figures

SUPPORTING STRUCTURE FOR A STEERING APPARATUS OF THE RACK AND PINION TYPE

BACKGROUND OF THE INVENTION

This invention relates to a supporting sturcture for a steering apparatus of the rack and pinion type.

As a conventional supporting structure for a steering apparatus of the rack and pinion type, for example, there is known a supporting structure such as shown in FIGS. 1 and 2. In the drawings, a rack axle supporting member R is constituted by a gear housing 1 and a rack tube 2. The rack tube 2 is connected to one end of the through-hole of the housing 1. A rack axle 3 is axially movably supported through a rack bush 5 in the rack axle supporting member R. Ball sockets 7 are threadably attached to the opposite ends of the rack axle 3, respectively. Two balls studs 9 which are respectively mounted to one end of each of two steering rods 8 are inserted into the ball sockets 7 respectively, thereby movably coupling the steering rods 8 to the opposite ends of the rack axle 3. A knuckle arm (not shown) is connected through a ball joint (not shown) to the other end of each of the steering rods 8. Furthermore, right and left road wheels for steering (not shown) are individually connected to the knuckle arms respectively. Rack boots 10 are provided on the opposite ends of the rack axle 3.

The gear housing 1 includes a pinion 4 to be interconnected to a steering shaft (not shown). The gear teeth of this pinion 4 engage a rack 3a of the rack axle 3 in the gear housing 1. The pinion 4 rotates with the rotation of the steering wheel to be attached to the upper end of the steering shaft. Thus, the rack axle 3 having the rack 3a adapted to engage the gear teeth of the pinion 4 moves relatively axially with respect to the rack axle supporting member R. As a result, the knuckle arms are rotated by means of the steering rods 8 which move along with the rack axle 3, thereby revolving the right and left road wheels for steering (not shown) of the vehicle.

The rack axle supporting member R is supported through mounting insulators 11 and 12 on the vehicle body (not shown) by means of clamping brackets 13 and 14. In other words, the ring-shaped mounting insulators 11 and 12 are attached to the outer peripheries of the gear housing 1 and rack tube 2. The mounting insulators 11 and 12 are mounted to predetermined locations in a vehicle body member 15 with the fitting portions of the mounting insulators coming into engagement therewith, for example, as shown in FIG. 2. The clamping brackets 13 and 14 are positioned around the mounting insulators 11 and 12 to sandwich the mounting insulators 11 and 12 respectively. Bolts 16 are inserted into the vehicle body member 15 through the clamping brackets 13 and 14 with their head portions being in threaded engagement with the member 15. Then, the bolts 16 are wrenched to elastically support the rack axle supporting member R onto the vehicle body through the mounting insulators 11 and 12.

In FIGS. 1 and 2, a protrusion 1a for positioning is formed in the gear housing 1, and an opening 13a adapted to receive this protrusion 1a therethrough is formed in the clamping bracket 13. A portion of the mounting insulator 11 and the protrusion 1a are inserted into this opening 13a, thereby restricting the circumferential rotation of the rack axle supporting member R.

However, in such a conventional supporting structure of the steering apparatus of the rack and pinion type, the mounting insulators 11 and 12 are interposed in a compressed condition between the rack axle supporting member R and the clamping brackets 13 and 14 to support the supporting member R onto the vehicle body. Therefore, the compression of the mounting insulators 11 and 12 changes according to differences in dimensional accuracy of each part such as the gear housing 1, clamping brackets 13 and 14, or the like, and according to the difference in the clamping forces of the respective bolts 16, so that the elastic constant of the mounting insulators 11 and 12 will largely vary. Moreover, since the rack axle supporting member R is elastically supported onto the vehicle body by means of the spring or elastic forces of the mounting insulators 11 and 12, when the rigidity of the mounting insulators 11 and 12 is high, the elastic constant of the mounting insulators 11 and 12 in the axial direction of the rack axle becomes large, causing shimmy to easily occur. On the other hand, there is also a problem that when the rigidity of the mounting insulators 11 and 12 is low, the durability of the mounting insulators 11 and 12 is reduced, even though it is effective to suppress the shimmy and to improve the maneuver stability during high-speed driving.

SUMMARY OF THE INVENTION

It is an object of the present invention to provide a supporting structure for a steering apparatus of the rack and pinion type wherein small forces inputed from the road wheels of the vehicle are received in a lower rigidity range while large forces are received in a higher rigidity range.

Another object of the invention is to provide a supporting structure for the steering apparatus of the rack and pinion type wherein the occurrence of shimmy is effectively suppressed and the maneuver stability is improved during high-speed driving.

Briefly described, these and other objects of the invention are accomplished by the provision of a supporting structure for the steering apparatus of the rack and pinion type which includes a mounting insulator comprising a first elastic means adapted to receive displacement forces caused in the rack axle supporting member in the axial direction thereof by means of a shearing stress, and a second elastic means adapted to receive displacement forces by means of a compressive stress, whereby when the displacement force applied to the rack axle supporting member is small, this small input force is received by means of the shearing stress in a lower rigidity range by the first elastic means, and when the input force is large, this large input force is received by means of the compressive stress in a higher rigidity range by the second elastic means in addition to the shearing stress by the first elastic means.

BRIEF DESCRIPTION OF THE DRAWINGS

In the drawings, like parts are designated by like reference numerals.

DETAILED DESCRIPTION OF THE PREFERRED EMBODIMENTS

Figure 3:
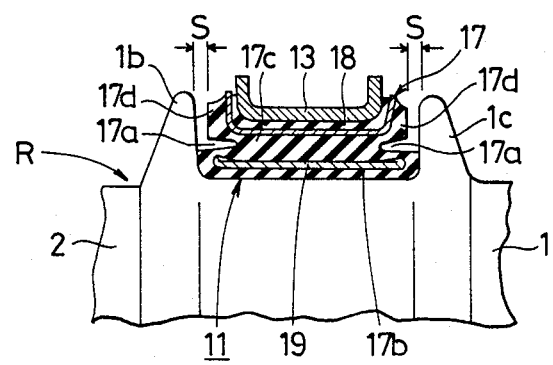
FIG. 3 is an explanatory view showing the principal section of an embodiment according to the present invention.
Figure 4:
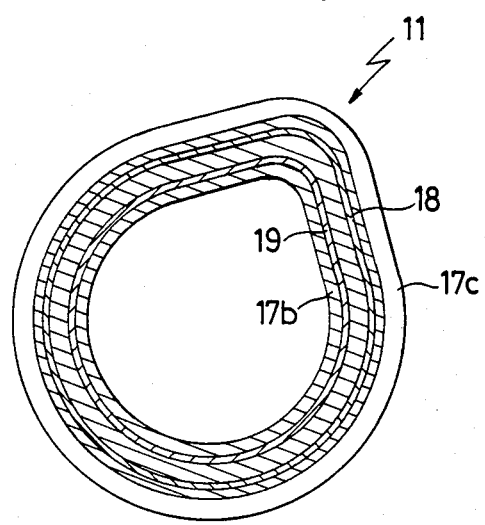
FIG. 4 is a cross sectional view in the radial direction of the mounting insulator of FIG. 3.

Referring to FIGS. 3 and 4, a mounting insulator 11 formed by an elastic material such as rubber comprises two arcuately segmented portions 17 which, after they have been assembled, form a ring-shape. Circumferentially continuous grooves 17a are formed in the opposite sides of this mounting insulator 11. A fixed portion 17b is formed radially inwardly while a displacement portion 17c is formed radially outwardly with these grooves 17a substantially therebetween at the opposite ends thereof. Arcuate or ring-shaped reinforcing cores 19 and 18 are concentrically disposed and embedded in the fixed portion 17b and the displacement portion 17c, respectively.

This mounting insulator 11 is attached to the insulator fitting portion of the gear housing 1 (although it is not shown, it is also attached to a rack tube). That is to say, the insulator fitting portion of the gear housing 1 is defined by two flange portions 1b and 1c formed with a proper space therebetween in the axial direction of a rack axle 3. The mounting insulator 11 is attached to the gear housing 1 by fitting the fixed portion 17b between the flange portions 1b and 1c. A rack axle supporting member R is constituted by these gear housing 1 and rack tube.

In FIG. 3, a clamping bracket 13 is fitted circumferentially onto the mounting insulator 11. This clamping bracket 13 is used to retain the rack axle supporting member R by means of a clamping force by bolts or the like to press the mounting insulator 11, thereby elastically supporting the rack axle supporting member R onto the vehicle body by means of the elastic or spring force of the compressed mounting insulator 11. In this case, a predetermined gap S is provided between the opposite side portions 17d extending from the displacement portion 17c of the compressed mounting insulator 11 and the flange portions 1b and 1c which face the side portions, respectively. The displacement portion 17c constitutes a first elastic means adapted to receive the axial displacement force of the rack axle by means of shearing deformation, while the side portions 17d constitute a second elastic means adapted to receive the axial displacement force of the rack axle by means of compressive deformation.

Figure 1:
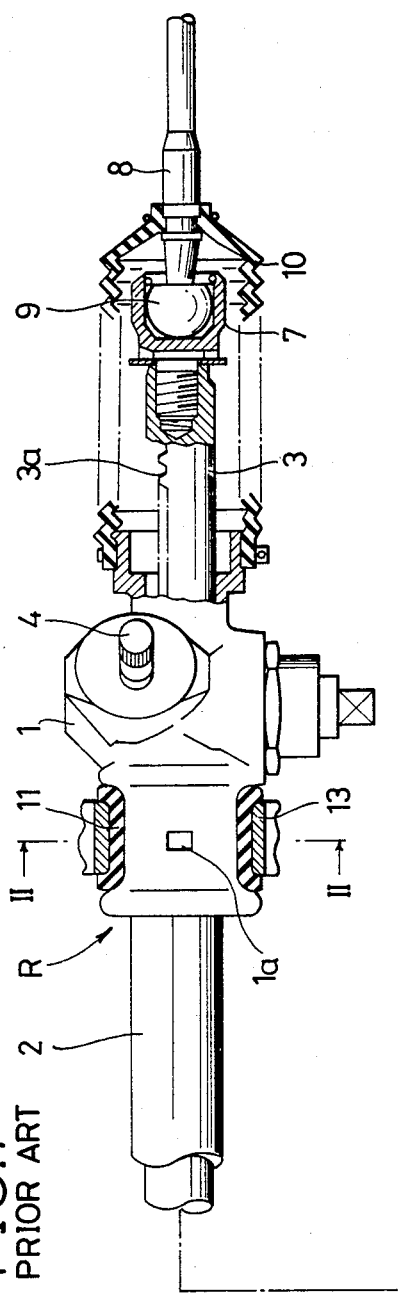
FIG. 1 is a partially cut-away, and partially cross sectional front view showing a conventional supporting structure for the steering apparatus of the rack and pinion type.
Figure 1:
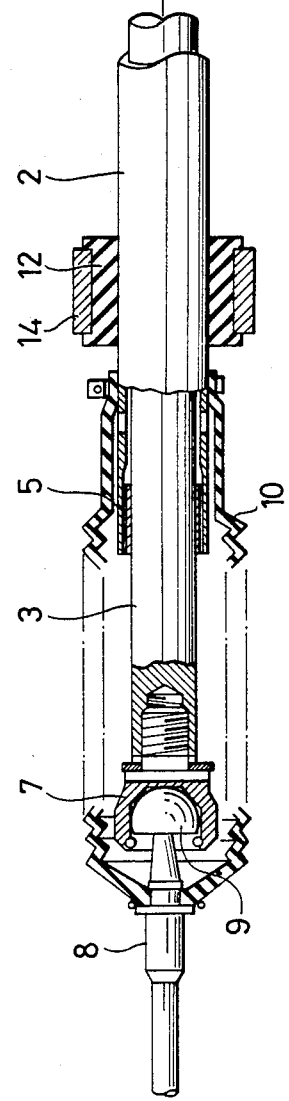
Figure 2:
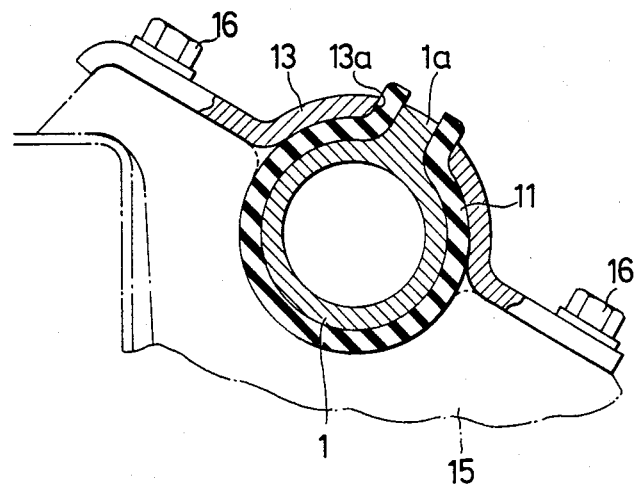
FIG. 2 is an enlarged cross sectional view taken along the line of II—II of FIG. 1.

The remainder of the structure is similar to the conventional one shown in FIGS. 1 and 2.

The operation of the steering structure according to the present invention will be described hereinafter.

The rack axle supporting member R is elastically supported onto the vehicle body by means of the clamping bracket 13 via the mounting insulator 11 which is circumferentially mounted to the outer periphery of the rack axle supporting member R as already described.

When micro vibrations are transmitted to this steering apparatus due to forces being inputed from the road wheels, the shearing stress of the mounting insulator 11 will act first, as an elastic or spring force in the axial direction of the rack axle 3 caused by this mounting insulator 11, against the input of the micro vibrations. Namely, the displacement portion 17c will deform in the shearing direction. At this time, the elastic constant of the mounting insulator 11 under the shearing stress is substantially constant as shown in the range 0 - a in the graph of FIG. 5. It will be appreciated from this graph that the mounting insulator has relatively lower rigidity and that, according to this mounting insulator 11, it is possible to absorb small input forces or micro vibrations by the shearing stress of the first elastic member constituting part of the mounting insulator 11 in the lower rigidity range. Therefore, it is possible to reduce shimmy or kick-back which would occur in this steering apparatus. In addition, since the compliance understeering of the suspension increases, the maneuver stability of the steering apparatus can be improved during high-speed driving.

On the other hand, in the case where a large input force is applied to the steering apparatus, for example, when the vehicle runs onto a curb or the like, the rack axle supporting member R and the clamping bracket 13 will displace relative to each other in the axial direction of the rack axle 3. When the amount of relative displacement becomes equal to or more than a predetermined gap S, the opposite side portions 17d constituting the second elastic means of the mounting insulator 11 will come into contact with the side surface of the flange portion 1b (or 1c). After the opposite side portions 17d have come into contact with the flange portions 1b or 1c, the compressive stress effected in the side portions 17d will act as the second elastic or spring force in the axial direction of the rack axle 3 produced by the mounting insulator 11, wherein the elastic constant of the mounting insulator 11 under the compressive stress varies as shown in the range a-b of FIG. 5. It will be noted that the mounting insulator 11 has relatively higher rigidity in the range a-b of FIG. 5.

Figure 5:
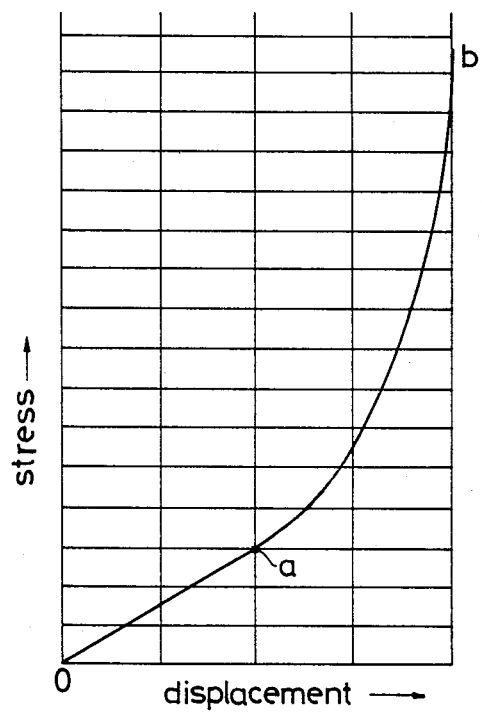
FIG. 5 is a graph showing the displacement to stress characteristics of the mounting insulator of the present invention.

In other words, the stress-displacement characteristics of this steering apparatus are as shown in FIG. 5; wherein this characteristics varies substantially linearly at a relatively small grade in the range of the shearing stress of the first elastic means until the second elastic means comes into contact with the flange portions 1b and 1c, namely until the portion indicated by the point a, and then increases in such a manner, for example, as shown by a quadratic curve as the displacement becomes large beyond the point a, because the compressive stress of the second elastic means will be added thereto. Therefore, the compressive stress of the second elastic means which constitutes part of the mounting insulator 11 can cope with large input forces in a higher rigidity range, i.e. large vibrations, thereby preventing the rack axle supporting member R from being displaced largely, that is, beyond the gap S. Hence, it is possible to restrict less than a predetermined value the motion of the gear housing 1 due to large input forces which may be applied to the steering apparatus. It is thereby also possible to remarkably improve the durability of the first elastic means 17c of this mounting insulator 11.

In this embodiment, the grooves 17a are formed in a pair of segmented insulator portions 17. The fixed portion 17b and the displacement portions 17c are formed radially inwardly and outwardly with reinforcing cores 19 and 18 embedded in the fixed portion 17b and the displacement portions 17c, respectively. The shearing deformation is centralized to the thin portions formed by providing the grooves 17a. Thus, it is possible to clearly define the change in rigidity due to the first and second elastic means of this mounting insulator 11.

Figure 6:
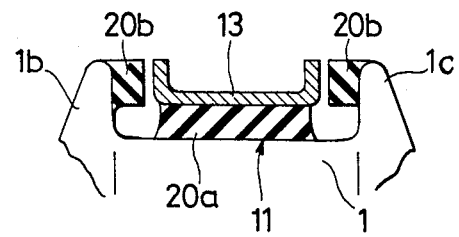
FIG. 6 is an explanatory view showing the principal section of another embodiment of this invention.

FIG. 6 shows another embodiment of this invention.

In this embodiment, first and second elastic means 20a and 20b, which constitute the mounting insulator 11, are separately and individually provided. The rack axle supporting member R is clamped and held through the first elastic means 20a. The second elastic means 20b comprises elastic members which are formed onto the flange portions 1b and 1c of the gear housing 1, respectively. With such a structure, a similar effect to the first embodiment described previously can be obtained.

The second elastic means 20b may be provided on the clamping bracket 13. The second elastic means 20b may be provided not only on the flange portions 1b and 1c but also on the clamping bracket 13. The second elastic means 20b may be further interposed between the flange portions 1b and 1c and the clamping bracket 13. In this case, the second elastic measn 20b are supported by flexible supporting members which, for example, protrude from the rack axle supporting member R radially outwardly. Therefore, in this case, the rack axle supporting member R first comes into contact with the second elastic means 20b, then the rack axle supporting member R comes into contact with the clamping bracket 13 through the second elastic means 20b.

As described above, according to the present invention, there is provided a supporting structure for a steering apparatus of the rack and pinion type wherein a rack axle supporting member comprises a rack tube and a gear housing adapted to support axially movably a rack axle. This rack axle supporting member is supported onto a vehicle body by means of a clamping member adapted to clamp the mounting insulator from the outside thereof through a mounting insulater provided around the rack axle supporting member. The mounting insulator comprises a first elastic means adapted to receive the axial displacement force introduced in the rack axle supporting member by means of the shearing stress, and a second elastic means adapted to receive the axial displacement force introduced in the rack axle supporting member by means of the compressive stress, wherein a gap is provided between an elastic portion or member of the second elastic means and the rack axle supporting member or the clamping member. Therefore, when the displacement amount of the rack axle supporting member due to a small input force being applied to the rack axle supporting member is less than the gap, the displacement will be received by means of the shearing stress in a relatively low rigidity range by the first elastic means. When the displacement amount of the rack axle supporting member exceeds the gap due to a large input force being applied to the rack axle supporting member at that time, the displacement will be received by means of the compressive stress in a relatively high rigidity range by the second elastic means in addition to the first elastic means, thereby reducing the motion of the gear housing to be less than a predetermined value. Thus, the use of this mounting insulator can effectively cope with either external forces of small input forces in a low rigidity range and large input forces in a high rigidity range.

Although preferred embodiments of the invention are specifically illustrated and described herein, it will be apreciated that many modifications and variations of the present invention are possible in light of the above teachings and within the purview of the appended claims without departing from the spirit and intended scope of the invention.

What is claimed is:

1. A supporting structure for a steering apparatus of the rack and pinion type comprising a rack axle supporting member which includes a rack tube and a gear housing adapted to axially movably support a rack axle, a mounting insulator provided around said rack axle supporting member, a clamping member around said mounting insulator for supporting said rack axle supporting member onto a vehicle body via said insulator, said mounting insulator comprising a first elastic means adapted to receive axial displacement forces applied to said rack axle supporting member by means of shearing stress and a second elastic means adapted to receive axial displacement forces applied to said rack axle supporting member by means of compressive stress.

2. The supporting structure as claimed in claim 1, wherein said supporting member is provided with a pair of flanges between which said mounting insulator is positioned.

3. The supporting structure as claimed in claim 2, wherein said pair of flanges face an elastic portion or member of the second elastic means with a gap therebetween.

4. The supporting structure as claimed in claim 2, said mounting insulator is formed in a ring and comprises a radially inward fixed portion and a radially outward displacement portion partially separated from said fixed portion with a pair of circumferential grooves formed on the opposite sides of said mounting insulator.

5. The supporting structure as claimed in claim 4, wherein said radially outward displacement portion face said pair of flanges of said supporting member.

6. The supporting structure as claimed in claim 4, wherein said first elastic means comprises a portion provided substantially axially between said pair of circumferential grooves and said second elastic means comprises side portions provided radially outward of said first elastic portion.

7. The supporting structure as claimed in claim 4, wherein a reinforcing core is embedded in said fixed portion.

8. The supporting structure as claimed in claim 4, wherein a reinforcing core is embedded in said displacement portion.

9. The supporting structure as claimed in claim 4, wherein arcuate or ring-shaped reinforcing cores are concentrically embedded in said fixed and displacement portions respectively.

10. The supporting structure as claimed in claim 3, wherein said second elastic means consists of a pair of individual elastic members each provided on said flange and facing said clamping member.

11. A supporting structure as claimed in claim 3, wherein said second elastic means consists of a pair of individual elastic members provided on the opposite sides of said clamping member and facing said flanges.

12. A supporting structure as claimed in claim 3, wherein said second elastic means consists of a pair of individual elastic members each extending between said flange and said opposite sides of said clamping member.

* * * * *